United States Patent [19]
Nemazie et al.

[11] Patent Number: 5,768,043
[45] Date of Patent: Jun. 16, 1998

[54] TABLE DRIVEN METHOD AND APPARATUS FOR AUTOMATIC SPLIT FIELD PROCESSING

[75] Inventors: Siamack Nemazie, San Jose; Son H. Ho, Sunnyvale, both of Calif.

[73] Assignee: Cirrus Logic, Inc., Fremont, Calif.

[21] Appl. No.: 548,397

[22] Filed: Oct. 26, 1995

Related U.S. Application Data

[63] Continuation of Ser. No. 205,626, Mar. 3, 1994, abandoned.

[51] Int. Cl.$^6$ .................................................. G11B 5/596
[52] U.S. Cl. ............................ 360/77.08; 360/48; 360/51
[58] Field of Search ........................... 360/51, 48, 77.08

[56] References Cited

U.S. PATENT DOCUMENTS

| | | | |
|---|---|---|---|
| 3,375,507 | 3/1968 | Gleim et al. | 360/72.2 |
| 4,297,737 | 10/1981 | Andresen et al. | 360/135 |
| 4,498,146 | 2/1985 | Martinez | 395/425 |
| 4,507,693 | 3/1985 | Matsuda et al. | 360/72.2 |
| 4,656,532 | 4/1987 | Greenberg et al. | 360/48 |
| 4,827,423 | 5/1989 | Beasley et al. | 364/468 |
| 4,914,530 | 4/1990 | Graham et al. | 360/48 |
| 4,924,331 | 5/1990 | Robinson et al. | 360/72.1 |
| 4,935,825 | 6/1990 | Worrell et al. | 360/54 |
| 4,999,720 | 3/1991 | Wilson et al. | 360/48 |
| 5,075,804 | 12/1991 | Deyring | 360/49 |
| 5,111,444 | 5/1992 | Fukushima et al. | 369/58 |
| 5,172,381 | 12/1992 | Karp et al. | 371/42 |
| 5,200,864 | 4/1993 | Dunn et al. | 360/48 |
| 5,200,959 | 4/1993 | Gross et al. | 371/21.6 |
| 5,235,585 | 8/1993 | Bish et al. | 369/54 |
| 5,255,136 | 10/1993 | Machado et al. | 360/77.02 |
| 5,270,877 | 12/1993 | Fukushima et al. | 360/48 |
| 5,270,979 | 12/1993 | Harari et al. | 365/218 |
| 5,271,018 | 12/1993 | Chan | 371/10.2 |
| 5,274,509 | 12/1993 | Buch | 360/48 |
| 5,276,564 | 1/1994 | Hessing et al. | 360/51 |

Primary Examiner—Andrew L. Sniezek
Attorney, Agent, or Firm—Maryam Imam; Dan A. Shifrin

[57] ABSTRACT

A table driven method and apparatus for automatic split field processing in a disk drive system stores data representing the split fields after each servo mark of a frame. Each track of the disk drive system is divided up into frames or groups of sectors or equivalently servo marks, each frame comprising a predetermined number N of sectors and a predetermined number M of servo marks. Beginning from the INDEX mark, after every N sectors or equivalently M servo marks, the next sector must start after the next servo mark. The value N is a constant within each zone on a disk but can vary from zone to zone as the storage density changes. The information for each servo mark within a frame is stored in a frame table in the buffer memory. A starting address pointer and an ending address pointer are used to keep track of the starting and ending addresses, respectively, of the frame table. An address pointer is used to point to the current entry of interest in the frame table. For each servo mark within the frame, a sector pulse counter is stored, representing the number of sector pulses between the current servo mark and the next servo mark. A first time delay DY1, representing the delay from the current servo mark to the first sector pulse to be generated and a second delay value DYS, representing the size of the last split field before the next servo mark are also stored.

32 Claims, 5 Drawing Sheets

TABLE DRIVEN METHOD AND APPARATUS FOR AUTOMATIC SPLIT FIELD PROCESSING

This is a continuation of application Ser. No. 08/205,626, filed Mar. 3, 1994, now abandoned.

FIELD OF THE INVENTION

The present invention relates to the control of storage systems for digital computers. More particularly, the present invention relates to the use of a storage table for automatically generating sector pulses and calculating split field sizes for control of storage in a disk drive system.

BACKGROUND OF THE INVENTION

Figure 1:
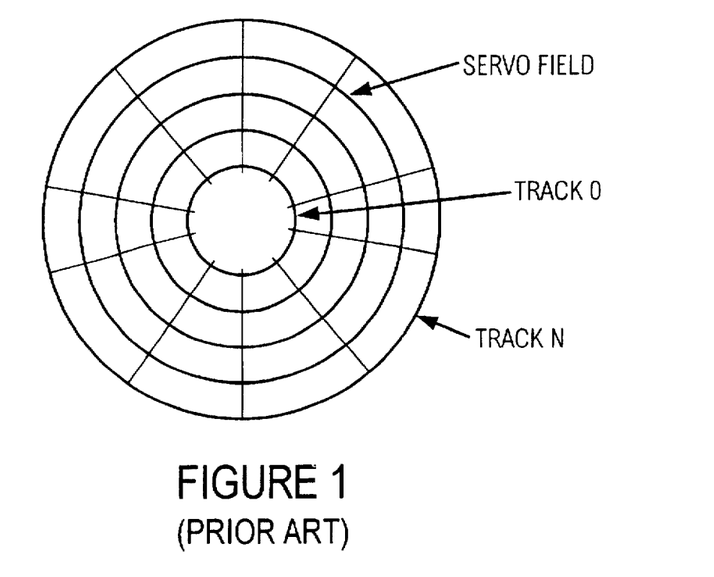
FIG. 1 illustrates an example of a magnetic media platter with embedded radial servo fields and circular tracks.

An example of a magnetic media platter with embedded servo fields is illustrated in FIG. 1. These servo fields may also be referred to as servo bursts or servo marks. Each concentric circle schematically represents one track which is subdivided into multiple sectors and each radial line extending from the center outward, represents a servo field. A servo field contains data which is pre-written on the disk, during manufacturing of the disk, concerning the location of the servo field and the track on the disk for positioning of the read/write head relative to a particular track. The servo fields are then used by the controller for positioning of the read/write head during read and write operations. It is imperative therefore, that the data within the servo fields not be written over. In order not to write over the data within a servo field, the controller must know where the servo fields are and be able to suspend write operations over that area.

The usable regions for storage on the disk are located on the tracks, between the servo fields. Data to be stored on the disk is written in these regions between the servo fields, which will be referred to as a data region. The recording of data within these regions is measured in bits per inch (BPI). Assuming a constant bit density to record a bit, the number of bits which can be recorded between servo fields is much less for the inner circle, track 0, than the number of bits which can be recorded in the outermost circle, track N. Though possible, it is impractical to provide a unique recording and reading speed for each track. In order to take advantage of the higher storage potential of the outer tracks without exceeding the allowable density on the inner tracks, the disk is divided into multiple zones and a method of zone bit recording is used. The tracks are grouped into zones such that all the tracks in one zone are adjacent to each other. The data rate at which data is written to or read from the disk is constant for all tracks within a zone and different for each zone. Because the disk is rotated at the same speed for all the zones, in order to take advantage of the greater recording area of the outer zones, the recording speed is increased for the outer zones on the disk.

Figure 2A:
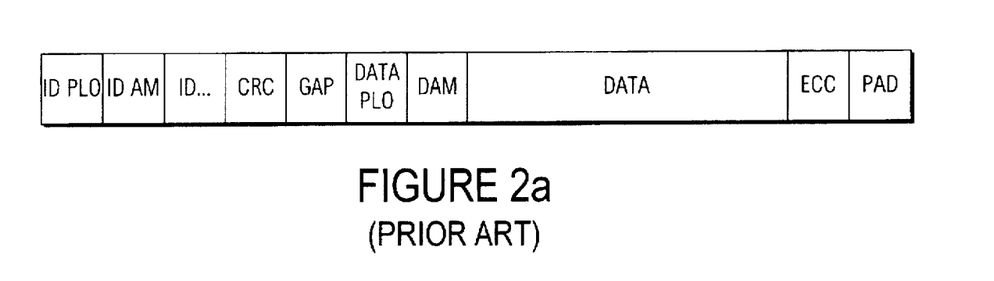
FIG. 2a illustrates the fields and subfields of a typical sector.

The data to be stored on a disk is broken up into manageable portions called sectors. Multiple sectors are generally stored on each track. An example of a typical format of a sector is illustrated in FIG. 2a. Each sector includes an ID field, a GAP field, a data field and a PAD field. The ID field is the unique identification tag for each sector in a track of a disk drive media and differentiates one sector from another. Within the ID field are four subfields, the ID PLO subfield, the ID AM subfield, the ID subfield and the CRC subfield. The ID PLO subfield is a multiple byte field of a known pattern which is used by the phase lock loop of the encoder/decoder (ENDEC) to synchronize to the incoming data stream. The ID AM subfield is one byte of a known pattern which is used by the drive controller to synchronize or align to the beginning of the ID subfield. This synchronization is necessary to align the disk controller to a data byte boundary, in order to differentiate each segment of data to a particular field. The ID subfield follows the ID AM subfield and contains the actual identification for the sector and consists of multiple bytes used to specify the address of the sector on the disk drive. The number of bytes within the ID subfield is at the discretion of the manufacturer of the disk drive and is controlled by the format of the particular disk drive used. The number of bytes within the ID subfield is the same for every sector and can comprise a cylinder high byte, a cylinder low byte, a sector number byte, a head number byte and a byte or two for defect management. The ID subfield is then followed by a fixed number of error detection bytes in the CRC subfield which are used to detect any errors in the ID field. Some formats, referred to as ID_Less formats, do not use an ID field, but rather use a header subfield within the DATA field.

The GAP field is a fixed number of bytes which are used to separate the ID field from the DATA field. The DATA field includes a DATA subfield and an error correction code (ECC) subfield. The DATA subfield is the portion of the sector where the actual data, which is communicated between the host computer and the disk drive, is stored. The ECC subfield is a fixed number of bytes tagged on to the end of the DATA subfield which are used to detect and correct soft or hard errors on the media within the capability of the code. This is necessary in order to avoid the transfer of erroneous data to and from the host computer.

Figure 2B:
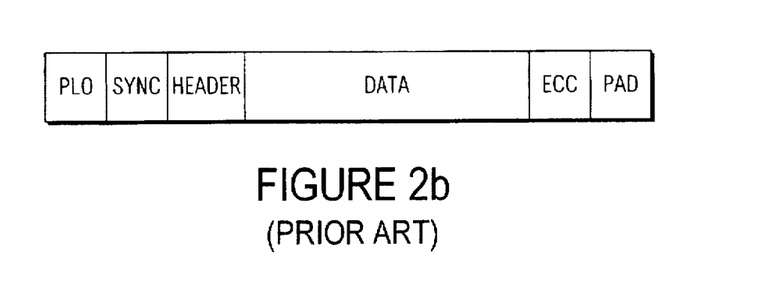
FIG. 2b illustrates a typical ID_Less sector format.

A typical ID_Less sector format is illustrated in FIG. 2b. In ID_Less formats, the ID field is replaced by a header subfield within the DATA field, thus combining the identification data and the DATA field into one field and reducing the number of bits necessary for each sector. The header subfield can be brought under the protection of the same ECC field as the DATA field and therefore afforded the same protection as the DATA field. The CRC field associated with the header subfield can be decreased or eliminated, further reducing the overhead of the system and eliminating the hardware which generates the CRC field. In ID_Less formats, all of the information in the sector header may be predetermined by reading a small number of other sector headers on the track, usually one. The sync field or PLO field in an ID_Less format can be reduced in size or the reliability of the sync circuitry improved since the sync field will always occur immediately after a sector pulse. Because some automatic calculation methods of the prior art calculate the split field sizes before the data field sync detection, they may not fully support an ID_Less format.

Employing constant density recording on a media with embedded servo fields where the servo fields are prerecorded at fixed angular distances relative to each other, will usually result in a track format that periodically requires a sector to be split in order to fit in the data regions. In order to obtain optimal or near optimal utilization of the space between the servo fields on a disk it may be necessary for the fields within a sector to be split in order to accommodate a servo burst. It is desirable to determine the fields that are split and the split field size automatically, without intervention by the microprocessor controlling the disk drive. It is also desirable to generate a sector pulse automatically to signal the beginning of each sector.

The disk drive system performs three major operations: format, read and write. The disk drive can format the disk for storing data in the format supported by the system and the disk. The disk drive system also performs write operations to the disk to store data on the disk transmitted from the host computer to the disk drive system and read operations from the disk to read data from the disk and transmit it to the host computer. The disk is continuously rotating within the disk drive system, even as the read/write head moves between zones, which may cause the read/write head to cross over one or more servo fields as it travels from one track or zone to another track or zone. The controller circuit knows the angular position of the read/write head, but as the read/write head changes tracks between different zones, the number of sectors between servo marks changes, because of the change in bit density between zones. The controller does not know how to translate this angular position after a zone change into a known position on the track relative to the sectors and may be unable to determine the relative positioning of the sector pulses on the specific track. To re-orient itself on the disk, the hard disk controller will normally wait for the INDEX mark and orient itself from the INDEX mark for the track that it is on. However, waiting for the INDEX mark during a read or write operation increases the latency in reaching the next desired sector. This delay adds to the seek latency of the disk drive system.

An automatic method for determining the fields that are split and the split field size is used by Cirrus Logic, Inc. of Fremont, Calif. in Part Number CL-SH360. This method imposes some constraints on track format, specifically by only allowing the data subfield to be split and not allowing a split in the ID field, the GAP field and the ECC subfield. The length of the data split fields is stored within the ID field during format operation and used during read and write operations. In order to avoid intervention by the microprocessor controlling the drive during the format operation, the ID fields of the track are stored in a table in the drive buffer memory and read from the drive buffer memory during format operation. This method does not support automatic generation of the sector pulse.

Another automatic method for determining the fields that are split and the split field size is used by Adaptec, Inc. of Milpitas, Calif. in Part Number AIC-7110. This method is based on a timing signal to indicate the time when a sector servo field is present in order to suspend and resume the disk's format, read or write operations. This timing signal can be generated by circuitry external to the drive controller to indicate the time when a servo field is present in order to suspend and resume the operation of the disk. This timing signal must always be asserted within the same byte in a given sector. However, due to fluctuations in detecting the sector servo field, this method is not reliable.

The timing signal for the AIC-7110 can also be generated when an internal counter underflows. In this method constraints are also imposed on the track format by not allowing a split in the ID field. An internal counter is loaded from a first-in first-out stack (FIFO) with a number representing the number of bytes from the data field SYNC byte to the next servo field. The counter is then decremented upon detection or writing of a SYNC byte. When this counter becomes zero, the timing signal is generated and the counter is loaded from the FIFO again. Using this method, the counter can be loaded automatically from the ID field or by the microprocessor controlling the drive. If the counter is loaded by the microprocessor controlling the drive, frequent intervention is required by the microprocessor. The AIC-7110 does not support automatically generating the sector pulse.

Another automatic method for calculating split fields and split field size is taught by Machado et al. in U.S. Pat. No. 5,255,136 issued on Oct. 19, 1993. This method also embeds the split information within the ID field and therefore does not allow the ID field to be split. The split field information is stored in count bytes which are stored on a byte count stack within the sequencer and will be loaded into a byte counter of the sequencer to be used by the sequencer for sequencing data sectors to the disk surface or reconstructing the data sectors into unbroken continuous byte sequences. This method also does not support automatic generation of sector pulses.

Another method proposed by Estakhri et al. in U.S. patent application Ser. No. 07/904,804 filed on Jun. 25, 1992, calculates the split counts and delay from the servo sector field to the sector pulse algorithmically without any track format constraints. This method is restricted because it requires a first table to find the delay from the servo mark to the first sector pulse after the servo mark and a second table to find the physical sector number of the first sector after the servo mark if the read, write or format operation is not starting from the INDEX mark. If the two tables are not used, this method must start from the INDEX mark at the beginning of each track. The requirement of starting the disk operation from the INDEX mark adds on the average, one half of a disk revolution to the seek latency for this method. This will increase the seek latency an average of 5.5 msec to 8.3 msec depending on the disk drive system. This is not an acceptable delay for most applications. Because seek latency is a parameter which is used to compare the performance of disk drives, it is desirable to implement a method for split field calculation which will help to minimize the seek latency of the disk drive system. To avoid the increased latency associated with starting the disk operation from the INDEX mark, the two tables referred to above are used.

This method taught by Estakhri et al. also requires a free running clock operating at the disk data rate from the encoder/decoder. Also within this method there are implicit timing restrictions used to calculate split field sizes before data field sync detection, which may be a problem in the ID_Less formats depending on the clock that is used for the state machine executing the algorithm. This method does support formats in which the data field comprises a data subfield and an ECC subfield but must be extended to support formats in which the data field consists of a header subfield, a data subfield and an ECC subfield.

What is needed is a method for calculating split field data and automatically generating a sector pulse. What is also needed is a method for storing split field information for a frame or track in memory. What is further needed is a system which also eliminates the embedding of split field information in the ID field of the sector. What is still further needed is a system which supports various track format constraints such as the ID_Less format and other format constraints such as not splitting the ECC subfield or in the case of formats that use an ID field for the sector, not splitting the ID field.

SUMMARY OF THE INVENTION

A table driven method and apparatus for automatic split field processing in a disk drive system stores data representing the split fields after each servo mark of a frame. Each track of the disk drive system is divided up into frames or groups of sectors or equivalently servo marks, each frame comprising a predetermined number N of sectors and a predetermined number M of servo marks. Beginning from the INDEX mark, after every N sectors or equivalently M servo marks, the next sector must start after the next servo mark. The value N is a constant within each zone on a disk but can vary from zone to zone as the storage density changes.

The information for each servo mark within a frame is stored in a frame table in the buffer memory. A starting address pointer and an ending address pointer are used to keep track of the starting and ending addresses, respectively, of the frame table. An address pointer is used to point to the current entry of interest in the frame table.

For each servo mark within the frame, a sector pulse counter is stored, representing the number of sector pulses between the current servo mark and the next servo mark. A first time delay DY1, representing the delay from the current servo mark to the first sector pulse to be generated and a second count value DYS, representing the size of the last split field before the next servo mark are also stored.

DETAILED DESCRIPTION OF THE PREFERRED EMBODIMENT

The table driven method of the present invention is based on storing the split data field information for each servo mark within a frame or a track in the Buffer random access memory (RAM). A frame includes a predetermined number N of sectors and a predetermined number M of servo marks ranging from a portion of a track to a whole track. Each frame within a zone will contain the same number N of sectors and the same number M of servo marks and will be formatted for storing data in the same manner. The frame method adds a periodicity to the operation of the system by requiring that, starting from the INDEX mark, after every N sectors or equivalently M servo marks, the next sector must begin after the next servo mark, even if there is enough space left to have a split field. In order for the repetitive nature of the frame to be advantageous, the frame must be a manageable number of sectors in that the Frame Table requires only a modest number of data bits and the Frame Table is relatively simple to calculate.

Using a frame system divides the track up into groups of sectors, wherein each group contains the same number of sectors and servo marks as every other group within a given zone. The calculations for the generation of sector pulses and split fields for each frame are the same. In order to store the sector pulse and split field information for the whole zone in memory, using a frame, all that is required is that this information be stored for one frame. The information is then repeated at the beginning of each new frame. Using a frame method may cause some space on the track to be wasted after the last sector of the frame, before the next servo mark, because the next sector must start after the next servo mark.

Figure 3:
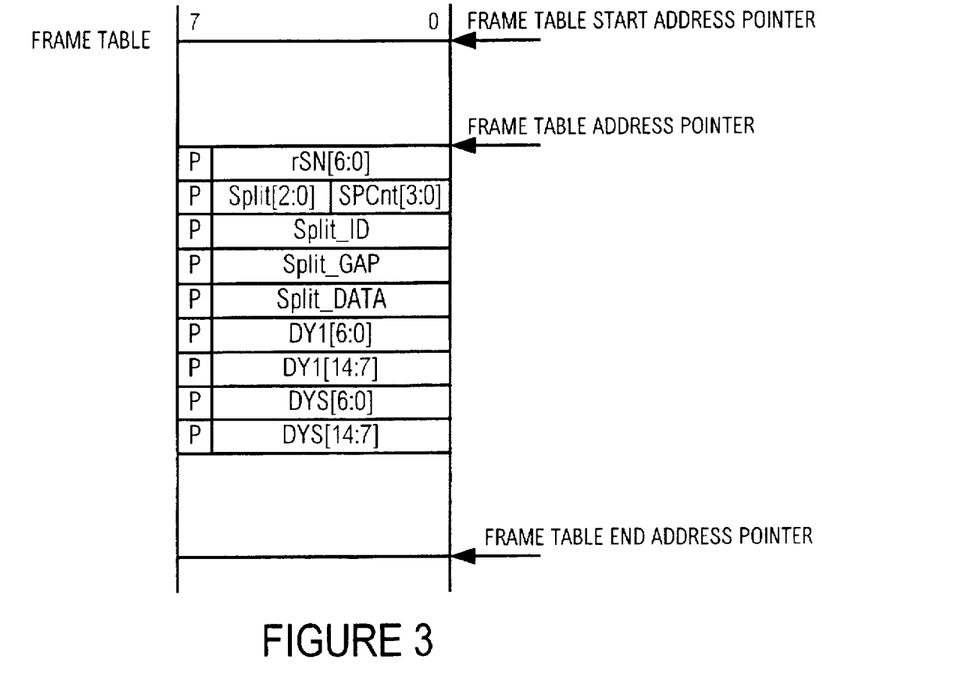
FIG. 3 illustrates a Frame Table and an entry within the Frame Table representing the corresponding values for a servo mark within the frame.

A Frame Table, illustrated in FIG. 3, containing information for each servo mark within the frame, is stored in the Buffer RAM. A six-byte entry or record of information is stored in the Frame Table for each servo mark in the frame. The entry in the Frame Table for each servo mark includes a four-bit sector pulse counter value SPCnt, three split field flags, a relative physical sector number value rPSN, a fourteen-bit clock delay value DY1 and a fourteen-bit formatter's split byte count value DYS.

The four-bit sector pulse counter SPCnt is stored for each servo mark. This sector pulse counter SPCnt indicates the number of sector pulses to be generated between the current servo mark and the next servo mark. A fourteen-bit delay register DY1 is also stored for each servo mark. The register DY1 indicates the clock delay from the servo mark to the first sector pulse to be generated after the servo mark. A fourteen-bit formatter's split byte count DYS is also stored for each servo mark. The register DYS indicates the byte count of the last split field, measured from the sync byte of the split field until the end of the split field, which occurs at the next servo mark. A seven-bit relative physical sector number register rPSN is also stored for each servo mark. The register rPSN indicates the relative physical sector number of the first sector after the current servo mark, relative to the start of the frame. This field rPSN can therefore range from zero for the first sector in the frame to N1 for the last sector in the frame.

The three split field flags include a Split_ID flag, a Split_GAP flag and a Split_DATA flag each signalling that their respective fields have been split. If the Split_ID flag is set, this signals to the Sector Mark And Split Field Engine SMASF that the ID field has been split and that the remainder of the split sector beginning with the remainder of the ID field will occur after the next servo mark. If the Split_GAP flag is set, this signals to the Sector Mark And Split Field Engine SMASF that the GAP field has been split and that the remainder of the split sector beginning with the DATA field will occur after the next servo mark. If the Split_DATA flag is set, this signals to the Sector Mark And Split Field Engine SMASF that the DATA field has been split and that the remainder of the split sector beginning with the remainder of the DATA field will occur after the next servo mark.

In the preferred embodiment, the Frame Table must be contiguous within the buffer RAM and can be located in any 64 Kbyte segment of the buffer. A Frame Table Start Address Pointer FTSAP points to a starting address of the Frame Table within the buffer memory. A Frame Table End Address Pointer FTEAP points to an ending address of the Frame Table within the buffer memory. The Frame Table Start Address Pointer FTSAP and the Frame Table End Address Pointer FTEAP are both stored in sixteen-bit registers. A three-byte Frame Table Address Pointer FTAP points to an entry in the Frame Table which represents an entry in the table. When the lower sixteen bits of the address pointer FTAP match the ending address pointer FTEAP, the lower sixteen bits of the address pointer FTAP is automatically reloaded with the starting address pointer FTSAP. The upper 8 bits of the address pointer FTAP is a segment selector which selects a 64 Kbyte segment within the buffer RAM.

In the section of the buffer RAM where the Frame Table is stored, bit seven of the buffer data can be configured to be the odd parity of bits zero through six if a parity configuration bit is set. If the parity configuration bit is not set, then bit seven of the buffer data is a don't care value and is internally reset.

Figure 4:
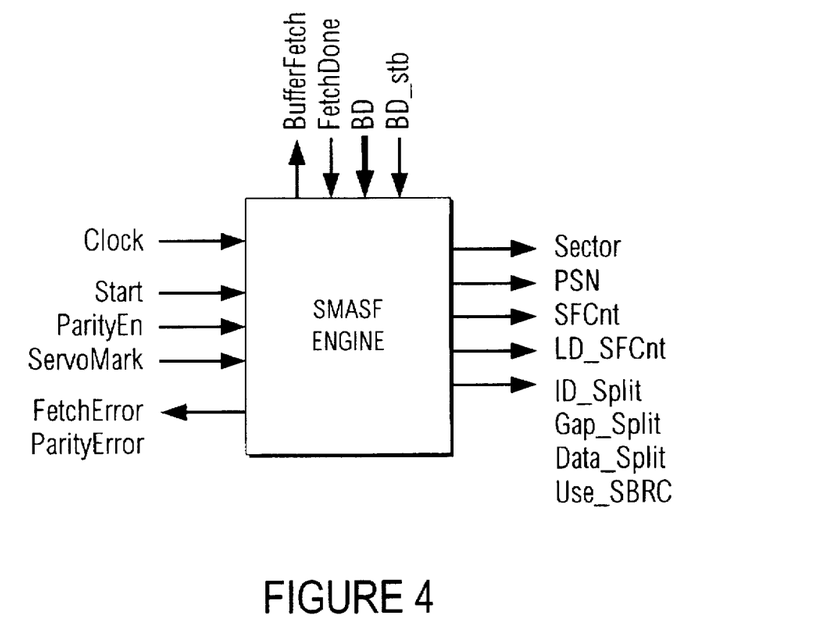
FIG. 4 illustrates a block diagram of a Sector Mark And Split Field Engine SMASF showing its inputs and outputs.

A block diagram of a Sector Mark And Split Field Engine SMASF showing its inputs and outputs is illustrated in FIG.

4. The Sector Mark and Split Field Engine SMASF includes a clock input, a start input, a parity enable input, a servo mark input, a fetch done input, a buffer data bus input, and a buffer data bus strobe input. A fetch error and parity error signal, a buffer fetch signal, a sector signal, a load split field count signal, an ID field split flag, a GAP field split flag, a DATA field split flag, a sector byte remaining count flag Use__SBRC, a physical sector number bus and a split field count bus are all output from the Sector Mark and Split Field Engine SMASF. The buffer data bus BD carries the buffer data as fetched from the Frame Table. The buffer data bus strobe BD__stb is used to strobe the record from the Frame Table into the storage registers inside the Sector Mark and Split Field Engine SMASF.

Figure 5:
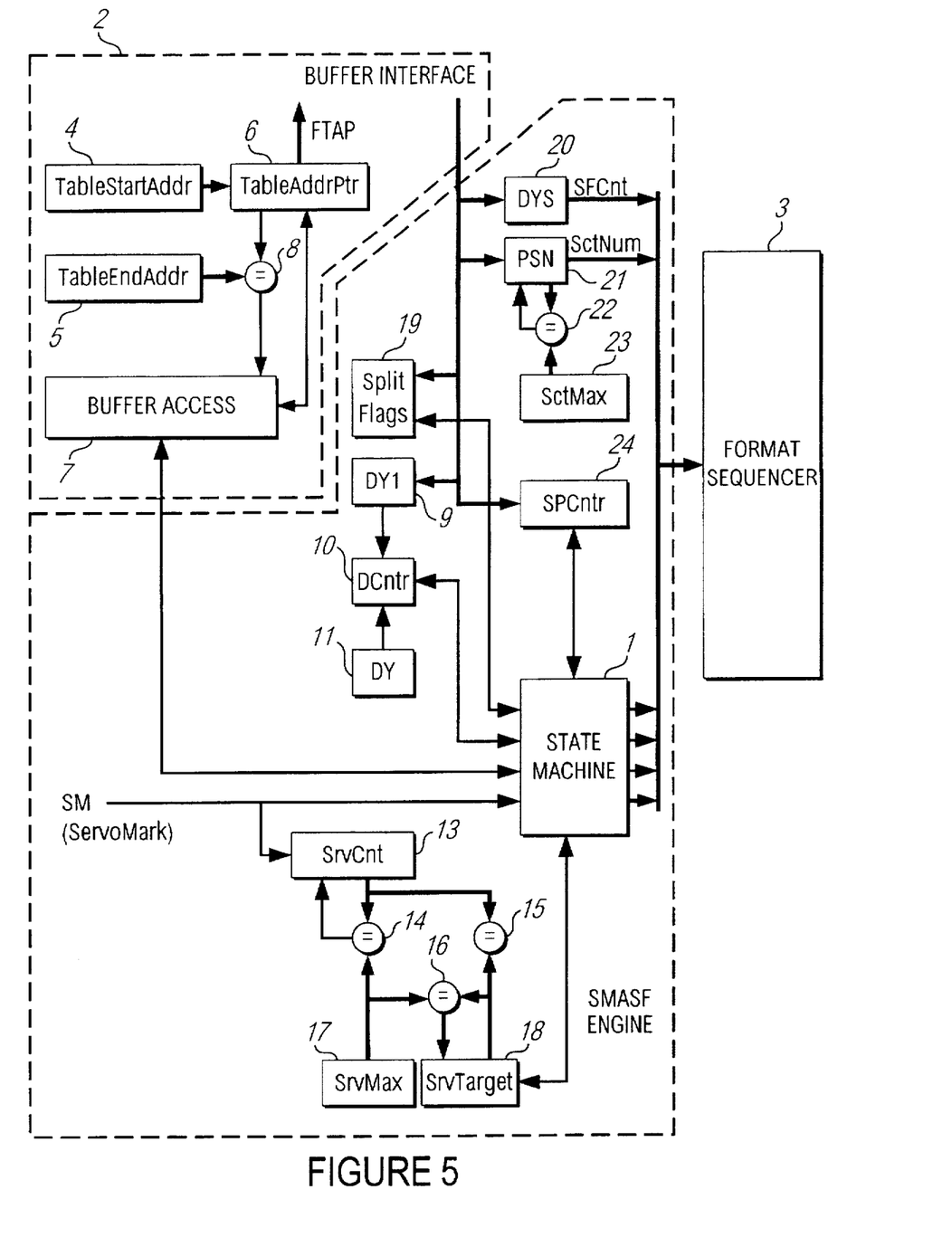
FIG. 5 illustrates a schematic diagram of a Sector Mark And Split Field Engine SMASF.

A schematic block diagram of the Sector Mark And Split Field Engine SMASF is illustrated in FIG. 5. The State Machine 1 in conjunction with the Format Sequencer 3 controls the operation of the Sector Mark And Split Field Engine SMASF which keeps track of sector pulse timing between the servo marks with various delay counters and internal registers. In the preferred embodiment, the Sector Mark And Split Field Engine SMASF, the delay counters and the internal registers are controlled by a free-running clock which can be changed for different zones. If the clock is changed, the Sector Mark And Split Field Engine SMASF is stopped during a zone change until the clock speed has been changed to the appropriate clock speed for that zone.

The Sector Mark And Split Field Engine SMASF includes an internal sixteen-bit delay register DY 11 which contains the number of clock cycles between two sector pulses if they occur before the next servo mark. The delay value from the register DY 11 is used to generate the second and subsequent sector pulses after a servo mark. The first sector pulse is always generated using the value from the register DY1 9. Therefore, the register DY 11 stores the number of clock cycles in a sector which is not split.

A sixteen-bit delay counter DCntr 10 is used by the Sector Mark And Split Field Engine SMASF to count down the delays corresponding to the delay values from the registers DY 11 and DY1 9. An internal eight-bit physical sector number counter PSN 21 is used by the Sector Mark And Split Field Engine SMASF to keep track of the physical sector number of the sectors. The physical sector number counter PSN 21 is loadable by the drive microprocessor to initialize the number of the first sector to be generated. The drive microprocessor can read the value of the relative physical sector mark number rPSN for the first sector after the current servo mark from the Frame Table entry for the target servo mark. After the physical sector number PSN is initialized by the drive microprocessor, the onboard logic of the system then keeps track of the sector number by incrementing the physical sector number counter PSN 21 every time a sector pulse is generated. Before the system is initialized, the drive microprocessor for the system detects the servo mark number from the information stored on the disk. This servo mark number is then translated by the microprocessor controller into a relative servo mark number corresponding to the servo mark number within the frame. To translate to the relative servo mark number the microprocessor controller adds one to the detected servo mark number and then divides the result by the number M of servo marks within the frame. The result of this division operation will then include a quotient and a remainder value. The quotient is equal to the frame number on the track of the current frame and the remainder value is equal to the relative servo mark number within the frame.

When the physical sector number counter PSN 21 is equal to the maximum sector number, stored in the register SctMax 23, the physical sector number counter PSN 21 then is reset to zero on the next sector pulse. The eight-bit register SctMax 23 stores a value representing the number of the last sector on the track. The comparator 22 compares the physical sector number from the register PSN 21 to the maximum sector number from the register SctMax 23. A sector pulse counter SPCntr 24 keeps track of the number of sector pulses which will be generated between the current servo mark and the next servo mark.

An eight-bit servo mark counter SrvCnt 13 is used by the Sector Mark And Split Field Engine SMASF to keep track of the servo mark number. The servo mark counter SrvCnt 13 is incremented on the leading edge of a servo mark signal. When the servo mark counter SrvCnt 13 is equal to a maximum servo mark number, it is reset to zero on the next leading edge of the servo mark signal. The maximum servo mark number is stored in the eight-bit register SrvMax 17 which stores a value representing the number of the last servo mark on the track. The comparator 14 compares the current servo mark number from the register SrvCnt 13 to the maximum servo mark number from the register SrvMax 17. The comparator 18 compares the target servo mark number from the register SrvTarget 18 to the maximum servo mark number from the register SrvMax 17.

An eight-bit servo target register SrvTarget 18 is an Internal register used by the Sector Mark And Split Field Engine SMASF and stores the starting servo number for the servo mark on which the Sector Mark And Split Field Engine SMASF is to start its operation. When the Sector Mark And Split Field Engine SMASF starts, it will wait until the servo mark counter SrvCnt 13 is equal to the value in the servo target register SrvTarget 18 before starting its operation. While the Sector Mark And Split Field Engine SMASF is running, the servo target register will be incremented automatically before each subsequent servo mark is detected.

The Sector Mark And Split Field Engine SMASF also uses the Frame Table pointers as described above. The sixteen-bit Frame Table Start Address Pointer FTSAP is stored in the register TableStartAddr 4 and points to the starting address of the Frame Table within the buffer RAM. The sixteen-bit Frame Table End Address Pointer FTEAP is stored in the register TableEndAddr 5 and points to the ending address of the Frame Table within the buffer RAM. The twentyfour-bit Frame Table Address Pointer FTAP is stored in the register TableAddrPtr 6 and points to the next record in the Frame Table through the Buffer Interface 2.

In order to manage the beginning of the operation, the drive microprocessor, through the Buffer Manager, initializes the servo target register SrvTarget 18, initializes the Frame Table Address Pointer FTAP, stored in the register TableAddrPtr 6, to the entry in the Frame Table corresponding to the number of the servo mark stored in the servo target register SrvTarget 18, and loads the physical sector number PSN 21 of the first sector after the servo target mark. The value stored in the servo target register SrvTarget 18 is initialized by the drive microprocessor and contains the number of the servo mark at which the Sector Mark And Split Field Engine SMASF is to begin generating sector pulses. The number programmed into the servo target register SrvTarget 18 is a number of a servo mark which is a predetermined number of servo marks away from the current servo mark or alternatively can be the servo mark number corresponding to the beginning of the next frame. If the servo target register SrvTarget 18 is to be programmed with a servo mark which is a predetermined number from the current servo mark, the target servo mark should be at least two servo marks ahead of the current servo mark to allow the Sector Mark And Split Field Engine SMASF time to complete its initialization. It is possible that one servo mark ahead of the current servo mark can be enough to complete the initialization, but the preferred method of the present invention programs the target servo mark so that it is two servo marks ahead of the current servo mark.

Once the drive microprocessor and the Buffer Interface 2 have performed the above initialization and the Sector Mark And Split Field Engine SMASF is started and has completed the fetch operation of the entry in the Frame Table corresponding to the target servo mark, the Sector Mark And Split Field Engine SMASF then waits until the current servo mark is equal to the target servo mark before it begins generating sector pulses. The comparator 15 compares the current servo mark from the register SrvCnt 13 to the target servo mark from the register SrvTarget 18.

Once the servo mark counter SrvCnt 13 is equal to the value in the servo target register SrvTarget 18, the Sector Mark And Split Field Engine SMASF then checks again for the completion of the fetch operation from the Frame Table in the buffer RAM. If the fetch operation has not been completed, the Sector Mark And Split Field Engine SMASF generates an error signal and the drive microprocessor then reinitializes the system, including reprogramming the servo target register SrvTarget 18 with a new target servo mark. The checks for completion of the fetch operation are done for each servo mark.

Once the servo mark counter SrvCnt 13 is equal to the value stored in the servo target register SrvTarget 18 and the fetch operation has been completed, then the Sector Mark And Split Field Engine SMASF loads the internal registers and counters with the information for the current servo mark from the Frame Table through the Buffer Interface 2. In the preferred embodiment of the invention the values retrieved by the fetch operation are directly loaded into the internal registers. Alternatively, the values retrieved by the fetch operation can be loaded into holding registers before they are loaded into the internal registers. Once the values are loaded into the internal registers, the Sector Mark And Split Field Engine SMASF then generates any sector pulses which are to be generated after the current servo mark, using the appropriate delay values and initializes the fetch operation for the values corresponding to the next servo mark.

The Format Sequencer 3 is separate from the Sector Mark And Split Field Engine SMASF, performs all sector or track processing and keeps track of the split field counts, including which field has been split. The Sector Mark And Split Field Engine SMASF generates the sector pulses and split information. The Format Sequencer 3 includes a Sector Byte Remaining Counter SBRC for keeping track of the byte count of the last split data field.

Figure 6:
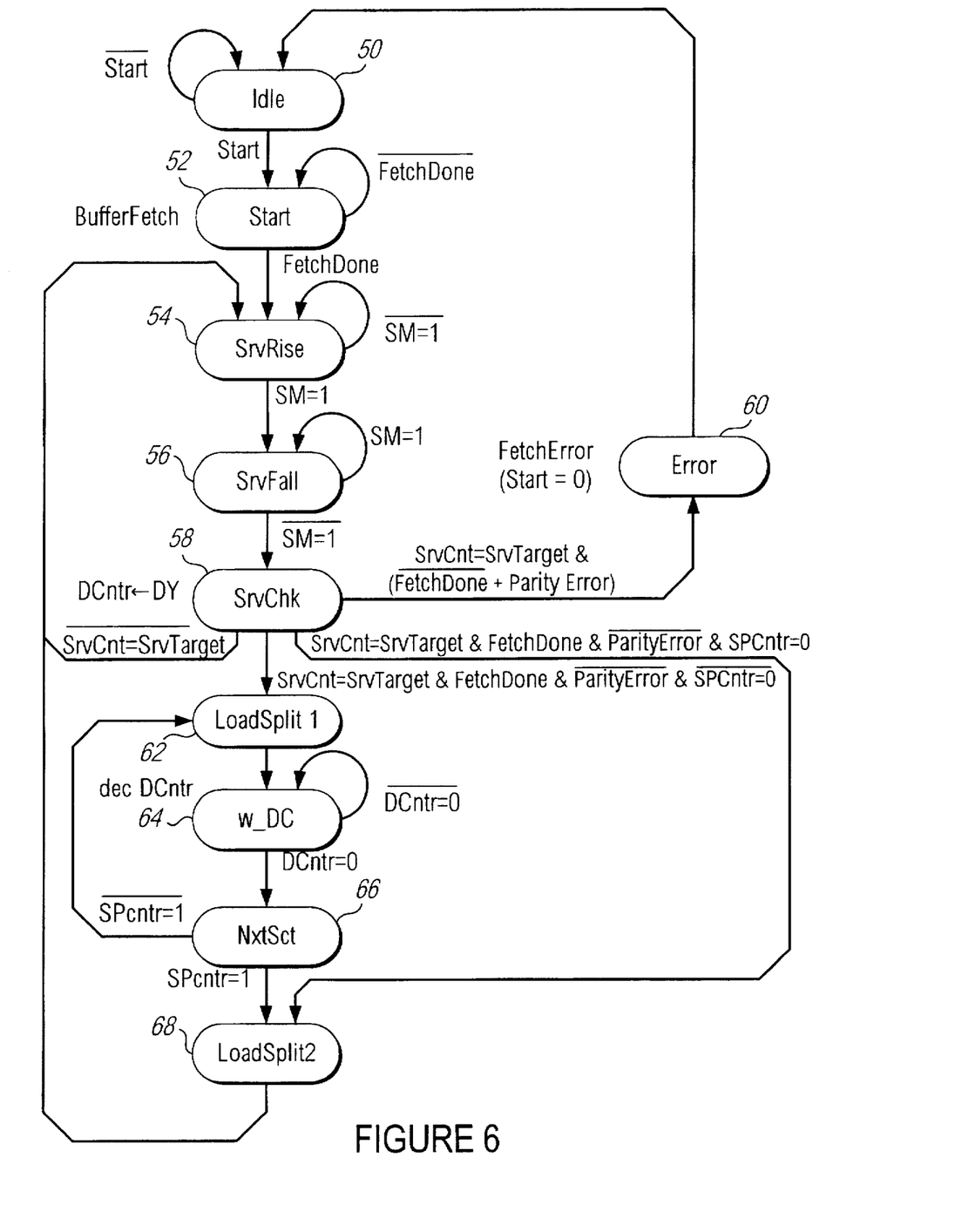
FIG. 6 illustrates a state diagram representing the operation of the state machine of the present invention.

A state diagram representing the operation of the State Machine 1 of the present invention is illustrated in FIG. 6. The State Machine 1 runs on a free running clock and includes the ten states shown in FIG. 6. The State Machine 1 begins in the Idle state 50 and stays there until a start instruction is received. Once the start instruction is received, the State Machine 1 then transitions to the Start state 52 and initiates the buffer fetch operation, described above, to fetch the entry in the Frame Table corresponding to the target servo mark. The State Machine 1 then waits in the Start state 52 until it is instructed by the Buffer Interface 2 that the fetch operation has Been completed.

Once the fetch operation is completed the State Machine 1 then goes into the SrvRise state 54 where it waits for the asssertion of the servo mark signal. Once the assertion of the servo mark signal has been detected the State Machine 1 then goes to the SrvFall state 56 where it waits for the negation of the servo mark signal, indicating that the servo field is complete.

After the negation of the servo mark signal has been detected, the State Machine 1 then goes into the SrvChk state 58 where several conditions are checked. The State Machine 1 at the state 58 first checks if the target servo mark has yet been detected. If the current servo counter SrvCnt 13 is not equal to the target servo mark from the register SrvTarget 18 then the State Machine 1 goes back to the SrvRise state 54 to wait for the rising edge of the next servo mark.

If the current servo mark counter SrvCnt 13 is equal to the value stored in the register SrvTarget 18 then the State Machine 1 at the state 58 next checks if the fetch operation has been completed. If the fetch operation has not been completed, this signals an error and the State Machine goes into the Error state 60. At the Error state 60, the State Machine 1 resets the Start Flag to a logical low voltage level and sets an error flag. The State Machine 1 can also enter the Error state 60 if there is a parity error in bit 7 of the data in the Frame Table.

If the current servo mark counter SrvCnt 13 is equal to the value stored in the register SrvTarget 18, the fetch operation has been completed and there is no parity error, the State Machine 1 then checks to see if the sector pulse counter SPCnt 24 is equal to zero, signalling that no sector pulses are to be generated after this servo mark. If all the conditions above are true then the state machine automatically jumps to the LoadSplit_2 state 68 which will be discussed in detail below.

If the current servo mark counter SrvCnt 13 is equal to the value stored in the register SrvTarget 18, the fetch operation has been completed, there is no parity error and the sector pulse counter SPCnt 24 is not equal to zero, the State Machine 1 then loads the delay counter DCntr 10 with the first sector pulse delay value DY1 and goes to the LoadSplit_1 state 62. At the LoadSplit_1 state 62 the State Machine 1 initializes the Use_SBRC, ID_Split, GAP_ Split and DATA_Split flags to the default values indicating that a new set of values for those flags will be loaded. In this case only the Use_SBRC flag is set because at least one more sector pulse is generated before the next servo mark. Therefore, the Split Field Count value SFCnt should be ignored by the Format Sequencer 3 when the State Machine 1 asserts the signal LD_SFCNT.

After the State Machine 1 has initialized the flags at the LoadSplit_1 state 62, the State Machine 1 then goes to the w_DC state 64 where the State Machine 1 decrements the delay counter until it reaches zero. This state furnishes a time delay for the next state which could be either the first sector pulse delay DY1 or the full sector delay DY. When the delay counter reaches zero, the State Machine then goes to the NxtSct state 66, where a sector pulse is generated and loads the delay counter DCNTR 10. At the state 66 the value in the physical sector number register PSN 21 is incremented by one, if it is not equal to the maximum sector number from the register SctMax 23. If the sector pulse counter SPCntr 24 value is then greater than one, the State Machine 1 will decrement the sector pulse counter SPCntr 24, load the delay counter DCntr 10 with the sector delay value DY from the register 11 and go back to the LoadSplit_1 state 62 for initializing and waiting the delay time period for generating the next sector pulse.

Once the sector pulse counter SPCntr is equal to one, the State Machine 1 will decrement the sector pulse counter SPCntr 24, load the delay counter DCntr 10 with the sector delay value from the register DY 11 and go to the LoadSplit_2 state 68. At this state 68 the State Machine 1 loads the split field count with the value from the DYS register 20, loads the split field flags with their respective values from the Frame Table and asserts the signal Ld_SFCnt as a strobe signal for the Format Sequencer 3 to latch in the split field count and the output values. The Use_SBRC flag is set to a logical high voltage level if all of the split flags are equal to a logical low voltage level. The BufferFetch signal is asserted to initiate the fetch of the next entry in the Frame Table corresponding to the next servo mark. Lastly, at the state 68 the target servo mark number SrvTarget is set to the value of the next servo mark number. This next value is either an increment of one if the target servo mark number SrvTarget is not equal to the maximum servo mark number from the register SrvMax 17 or is equal to zero if the target servo mark number SrvTarget is equal to the maximum servo mark number. After the instructions for the state 68 are completed, the State Machine 1 goes back to the SrvRise state 54 to wait for the beginning of the next servo mark and repeats the process for that servo mark.

Figure 7:
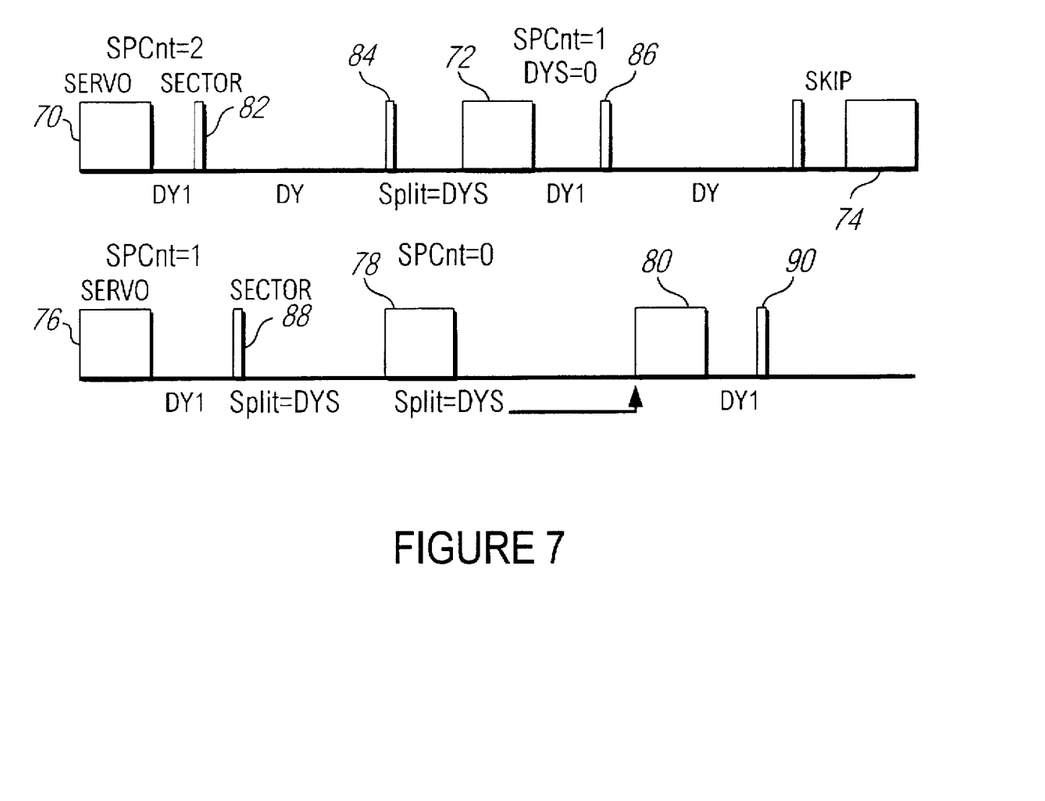
FIG. 7 illustrates two examples of sector pulse generation and split field calculation using the method and apparatus of the present invention.

Two examples of sector pulse generation and split field calculation using the method and apparatus of the present invention are illustrated in FIG. 7. In the first example, beginning with the servo mark 70, assuming that the system is initialized and has completed the fetch for the servo mark 70, the Sector Mark And Split Field Engine SMASF then loads the delay counter 10 with the first sector pulse delay value from the delay register 9. Once the delay counter 10 has counted down from this delay value, the Sector Mark And Split Field Engine SMASF then generates the sector pulse 82 and decrements the sector pulse counter 24. Because the sector pulse counter 24 is equal to a value greater then zero, signalling that at least one more sector pulse will be generated before the next servo mark, the Sector Mark And Split Field Engine SMASF loads the delay counter 10 with the full sector pulse delay value from the delay register 11. Once the delay counter 10 has counted down from this delay value, the Sector Mark And Split Field Engine SMASF then generates the sector pulse 84 and decrements the sector pulse counter 24. Because the sector pulse counter 24 is now equal to zero, signalling that no more sector pulses will be generated before the next servo mark 72, the Sector Mark And Split Field Engine SMASF loads the format sequencer with the split field count value DYS from the register 20.

The system then waits for the assertion of the next servo mark 72 and fetches the values from the frame table corresponding to that servo mark. After the assertion of the servo mark 72, the value of the sector pulse counter 24 is checked and because this value is greater than zero and a first sector pulse has not yet been generated, the Sector Mark And Split Field Engine SMASF loads the delay counter 10 with the first sector pulse delay value from the register 9. Once the delay counter 10 has counted down from this delay value, the first sector pulse is generated and the sector pulse counter 10 is decremented. Because the sector pulse counter 10 is now equal to zero, signalling that no more sector pulses are to be generated before the next servo mark, and all of the split flags are at a logical low voltage level, the Sector Mark And Split Field Engine SMASF recognizes that this is the last sector within this frame and therefore it will not generate any more sector pulses until after the next servo mark 74.

In the second example of FIG. 7, beginning with the servo mark 76, a sector, beginning with the sector pulse 88, is illustrated which lasts more than two servo marks. The Sector Mark And Split Field Engine SMASF recognizes this situation because after the assertion of the servo mark 78, the sector pulse counter 24 is equal to zero, signalling that no sector pulses will be generated after this servo mark 78. When the sector pulse counter 24 is equal to zero after the assertion of the servo mark 78, the Sector Mark And Split Field Engine SMASF automatically loads the format sequencer 3 with the split field count value DYS from the register 20. The Sector Mark And Split Field Engine SMASF initiates the fetch of the next entry from the Frame Table and then waits until the assertion of the next servo mark 80. After the assertion of the servo mark 80, because the sector pulse counter is greater than zero, the delay counter 10 is loaded with the first sector pulse delay value DY1 from the register 9. After the delay counter 10 has counted down from this delay value, the first sector pulse 90 is generated.

The number of sectors within a frame can be any number depending on the design and operation of a particular system. In the preferred embodiment of the present invention, at the beginning of each track on the media within the disk drive system, a new frame is started. It is not required at the end of a track that the last frame is a full frame. The last frame on the track can be a partial frame, depending on the size of the track relative to the size of a frame, in order to maximize the number of sectors which can fit on a track. Alternately, a system could be designed which requires the last frame on a track to be a full frame. In either of the above cases, the end of the track is detected, as explained above, by comparing the servo target register Srv_Target 18 with a maximum servo mark number, stored in the register SrvMax 17. If the servo target register Srv_Target is equal to the maximum servo mark number, then the apparatus of the present invention is signalled that the end of the track has been reached.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

We claim:

1. A method of automatic split field calculation in a magnetic media system using a magnetic media having a plurality of circular tracks, each track having a plurality of radial servo marks wherein one of the servo marks is an INDEX mark and wherein all other servo marks are identified by a unique number, wherein the media is rotated within the magnetic media system in relation to a read/write head for writing a sector to or reading a sector from one of a plurality of information regions, each region being positioned along one of the tracks between two adjacent servo marks such that each region has a capacity for storing information bits and wherein each sector includes a data field and a header field, the method having a capability to start an operation at one of the servo marks without waiting for the INDEX mark and comprising the steps of:

a. providing a frame table for storing entries, each entry representing more than one split field flag and a number of sector pulses, with each flag indicating which of the fields has been split and the location of a split within the sector;

b. detecting the number of a current servo mark representing the read/write head's position relative to the media;

c. initializing the number of a target servo mark to equal the number of a first servo mark for which the system will begin operation, the number of the target servo mark being designated as the number of the servo mark which is a predetermined number of servo marks ahead of the current servo mark;

d. converting the number of the target servo mark to the number of a relative target servo mark within a frame, the frame having a length smaller than the track length and including N sectors and M servo marks, N and M being integer values greater than zero;

e. incrementing the number of the current servo mark as a next servo mark is detected;

f. fetching an entry from the frame table corresponding to the number of the relative target servo mark, the entry representing a number of sector pulses to be automatically generated after the target servo mark, while waiting until the number of the current servo mark is equal to the number of the target servo mark;

g. incrementing the number of the target servo mark as each next servo mark is detected, once the number of the current servo mark equals the number of the target servo mark, to identify an incremented target servo mark;

h. converting the incremented target servo mark to an incremented relative target servo mark within a frame;

i. fetching an entry from the frame table corresponding to the number of the incremented relative target servo mark, wherein after every N sectors and M servo marks, the frame repeats itself; and j. repeating steps g–i until the operation is complete.

2. The method as claimed in claim 1 wherein a last frame on a track is a partial frame.

3. The method as claimed in claim 1 wherein each sector comprises a plurality of fields and further wherein the entry from the frame table includes split field flags indicating whether any field has been split and if so for each of said split field a first portion of the sector is stored before a servo mark and a second remaining portion of the sector is stored after a servo mark.

4. The method as claimed in claim 3 further comprising the step of loading the fetched entry from the frame table into internal registers and counters within the system once the fetch of an entry from a frame table has been completed.

5. The method as claimed in claim 4 wherein the entry from the frame table includes a sector pulse count, a delay value and a split field count value.

6. The method as claimed in claim 5 wherein the first delay value represents a first delay time period after a servo mark to a generation of a first sector pulse for a non-zero sector pulse count.

7. The method as claimed in claim 6 wherein the split field count value represents a number of bytes within a split sector field which occurs before assertion of a next servo mark.

8. The method as claimed in claim 7 wherein the frame table is stored in buffer random access memory of the system.

9. The method as claimed in claim 1 wherein each sector comprises a plurality of fields and further wherein the entry from the frame table includes split field flags indicating whether any field has been split and if so for each of said split field a first portion of the sector is stored before a servo mark and a second remaining portion of the sector is stored after one or more servo marks.

10. The method as claimed in claim 1 further comprising the step of automatically generating a number of sector pulses after each servo mark corresponding to the entry in the frame table.

11. An apparatus for automatic split field calculation in a magnetic media system using a magnetic media having a plurality of circular tracks, each track having a plurality of radial servo marks wherein one of the servo marks is an INDEX mark and wherein all other servo marks are identified by a unique number, wherein the media is rotated within the magnetic media system in relation to a read/write head for writing a sector to or reading a sector from one of a second plurality of information regions, each region being positioned along one of the tracks between two adjacent servo marks such that each region has a capacity for storing information bits and wherein each sector includes a data field and a header field, the apparatus having a capability to start an operation at one of the servo marks without waiting for an INDEX mark and comprising:

a. a detecting circuit for detecting the number of a current servo mark representing the read/write head's position relative to the media;

b. an initializing circuit coupled to the detecting circuit for initializing the number of a target servo mark to equal the number of a first servo mark for which the system will begin operation, the number of the target servo mark being designated as the number of the servo mark which is a predetermined number of servo marks ahead of the current servo mark;

c. a converting circuit coupled to the initializing circuit for converting the number of the target servo mark to the number of a relative target servo mark within a frame, the frame having a length smaller than the track length and including N sectors and M servo marks, N and M being integer values greater than zero;

d. a first incrementing circuit coupled to the converting circuit for incrementing the number of the current servo mark as a next servo mark is detected;

e. a second incrementing circuit coupled to the first incrementing circuit and the converting circuit for incrementing the number of the target servo mark as each servo mark is detected, once the number of the current servo mark is equal to the number of the target servo mark, to identify an incremented target servo mark;

f. a frame table coupled to the converting circuit and to the incrementing circuit for storing entries, each of the entries representing a split field, a number of sector pulses to be automatically generated after the target servo mark, and more than one split field flag with each flag indicating which of the fields has been split and the location of a split within the sector;

g. a retrieving circuit coupled to the frame table for fetching an entry from the frame table corresponding to the relative target servo mark, while waiting until the number of the current servo mark is equal to the number of the target servo mark and subsequently fetching corresponding subsequent entries from the frame table for each subsequent servo mark after the target servo mark corresponding to the incremented target servo mark and a relative servo mark within the frame, wherein after every N sectors and M servo marks, the frame repeats itself; and h. a generating circuit coupled to the retrieving circuit and to the operating circuit for automatically generating sector pulses.

12. The apparatus as claimed in claim 11 wherein a last frame on a track is a partial frame.

13. The apparatus as claimed in claim 11 wherein one frame equals a track length.

14. The apparatus as claimed in claim 11 wherein each sector comprises a plurality of fields and further wherein the entry from the frame table includes a seventh plurality of split field flags indicating whether any field has been split and if so for each of said split field a first portion of the sector is stored before a servo mark and a second remaining portion of the sector is stored after a servo mark.

15. The apparatus as claimed in claim 14 further comprising a sixth plurality of internal registers and counters coupled to the retrieval circuit for storing the fetched entry from the frame table.

16. The apparatus as claimed in claim 15 wherein each entry from the frame table includes a sector pulse count, a first delay value and a split field count value.

17. The apparatus as claimed in claim 16 wherein the frame table is stored in buffer random access memory of the system.

18. The apparatus as claimed in claim 11 wherein each sector comprises a plurality of fields and further wherein the entry from the frame table includes a seventh plurality of split field flags indicating whether any field has been split and if so for each of said split field a first portion of the sector is stored before a servo mark and a second remaining portion of the sector is stored after one or more servo marks.

19. A table driven method of automatic split field calculation in magnetic media systems using media which have a first plurality of circular tracks, each track having an INDEX mark, and a plurality of radial servo marks wherein each servo mark is identified by a unique number, wherein the media is rotated within the magnetic media system in relation to a read/write head, the method having the capability to start from any servo mark on the track without waiting for the INDEX mark and comprising the steps of:

a. providing a frame table for storing entries, each entry representing more than one split field flag and a number of sector pulses, with each flag indicating which field has been split and the location of a split within the sector, b. detecting the number of a current servo mark representing the read/write head's position relative to the media;

c. initializing the number of a target servo mark count to equal the number of a first servo mark for which the system will begin operation, the number of the target servo mark being designated as the number of a servo mark which is a predetermined number of servo marks ahead of the current servo marks;

d. converting the number of the target servo mark to the number of a relative target servo mark within a frame, the frame having a length smaller than the track length and including N sectors and M servo marks, N and M being integer values greater than zero;

e. fetching an entry from the frame table representing the number of the relative target servo mark;

f. comparing the number of the target servo mark to the number of the current servo mark;

g. incrementing the number of the current servo mark as a next servo mark is detected;

h. repeating steps d–f until the number of the target servo mark is equal to the number of the current servo mark;

i. repeating steps b–h if the fetch of an entry from the frame table has not yet been completed;

j. loading the entry from the frame table into internal registers within the system once the fetch of any entry from the frame table has been completed;

k. providing split field information for each sector pulse from the current servo mark to the next servo mark;

l. skipping steps m–o if no sector pulse is generated before the next servo mark;

m. waiting a first delay time period before generating a first sector pulse after the current servo mark;

n. generating a predetermined number of sector pulses after the first sector pulse and before a next servo mark;

o. waiting a second delay time period from a last sector pulse generated until the assertion of the next servo mark;

p. incrementing the number of the relative target servo mark after the second delay time period for the next servo mark; and q. repeating steps i–m for each subsequent servo mark until the operation is complete.

20. The method as claimed in claim 19 wherein the entry from the frame table includes a sector pulse count, a first delay value, a split field count value and a third plurality of split flags for each servo mark in the frame.

21. The method as claimed in claim 20 wherein the sector pulse count represents the predetermined number of sector pulses plus the first sector pulse for a non-zero sector pulse count.

22. The method as claimed in claim 21 wherein the first delay value represents the first delay time period.

23. The method as claimed in claim 22 wherein the split field count value corresponds to the second delay time period and represents a number of bytes within a split sector field which occurs before assertion of a next servo mark.

24. The method as claimed in claim 19 wherein each sector comprises a fourth plurality of fields, each field being selectively split so that a first portion of the sector is stored before a servo mark and a second remaining portion of the sector is stored after a servo mark.

25. The method as claimed in claim 19 wherein each sector comprises a plurality of fields, each field being selectively split so that a first portion of the sector is stored before a servo mark and a second remaining portion of the sector is stored after one or more servo marks.

26. An apparatus for automatic split field calculation in magnetic media systems using media which have a plurality of circular tracks, each track having an INDEX mark and having a predetermined number of sectors each including a data field and a header field, the media also having a plurality of radial servo marks each identified by a unique number, wherein the media is rotated within the magnetic media system in relation to a read/write head, the apparatus having the capability to start from any servo mark on the track without waiting for the INDEX mark and comprising:

a. a detecting circuit for detecting the number of a current servo mark corresponding to the position of the read/write head;

b. a target servo mark counter coupled to the detecting circuit for storing the number of a first servo mark for which the system will begin operation, the number of the target servo mark being designated as the number of a servo mark which is a predetermined number of servo marks ahead of the current servo mark;

c. a frame table comprising a plurality of entries coupled to the target servo mark counter, each entry representing split field and sector pulse information for a servo mark within the frame and more than one split field flag with each flag indicating which field has been split and the location of a split within the sector wherein the frame includes a number of sectors that is less than the predetermined number of sectors within the track;

d. a comparator coupled to the target servo mark counter and to the detecting circuit, for comparing the number of the target servo mark counter to the number of the current servo mark; and e. an internal register network coupled to the frame table for storing split field and sector pulse information from the frame table for the target servo mark.

27. The apparatus as claimed in claim 26 wherein each of the third plurality of entries include a sector pulse count value, a first delay value, a split field count value and a fourth plurality of split flags corresponding to a servo mark within the frame.

28. The apparatus as claimed in claim 27 wherein the sector pulse count value represents a number of sector pulses to be generated after the corresponding servo mark and before a next servo mark.

29. The apparatus as claimed in claim 28 wherein the first delay value represents a first delay period corresponding to a delay from assertion of the current servo-mark until an assertion of a first sector pulse for a non-zero sector pulse count value.

30. The apparatus as claimed in claim 29 wherein the split field count value represents a number of bytes within a split sector field which occurs before assertion of a next servo mark.

31. The apparatus as claimed in claim 26 wherein each sector comprises a fifth plurality of fields, each field being selectively split so that a first portion of the sector is stored before a servo mark and a second remaining portion of the sector is stored after a servo mark.

32. The apparatus as claimed in claim 26 wherein each sector comprises a fifth plurality of fields, each field being selectively split so that a first portion of the sector is stored before a servo mark and a second remaining portion of the sector is stored after one or more servo marks.

\* \* \* \* \*